(12) United States Patent
Matt (10) Patent No.: US 9,102,248 B2
(45) Date of Patent: Aug. 11, 2015

(54) QUICK ADJUST CONTINUOUSLY ENGAGED RECLINER

(75) Inventor: Samuel J Matt, Hazel Park, MI (US)

(73) Assignee: Magna Seating Inc., Aurora, Ontario (CA)

( * ) Notice: Subject to any disclaimer, the term of this patent is extended or adjusted under 35 U.S.C. 154(b) by 0 days.

(21) Appl. No.: 14/342,896

(22) PCT Filed: Sep. 10, 2012

(86) PCT No.: PCT/CA2012/000834
§ 371 (c)(1),
(2), (4) Date: Mar. 5, 2014

(87) PCT Pub. No.: WO2013/033829
PCT Pub. Date: Mar. 14, 2013

(65) Prior Publication Data
US 2014/0225411 A1    Aug. 14, 2014

Related U.S. Application Data

(60) Provisional application No. 61/532,135, filed on Sep. 8, 2011.

(51) Int. Cl.
*B60N 2/235*    (2006.01)
*B60N 2/68*     (2006.01)
(Continued)

(52) U.S. Cl.
CPC ............. *B60N 2/2356* (2013.01); *B60N 2/20* (2013.01); *B60N 2/2254* (2013.01); *B60N 2/2352* (2013.01); *B60N 2/682* (2013.01)

(58) Field of Classification Search
CPC .. B60N 2/2252; B60N 2/0232; B60N 2/2258; B60N 2/2358; B60N 2/2254; B60N 2/2352; B60N 2/2356; B60N 2/682; B60N 2/20
USPC .................. 297/362, 367 R, 367 P, 367 L
See application file for complete search history.

(56) References Cited

U.S. PATENT DOCUMENTS 5,810,442 A * 9/1998 Ito et al. ................ 297/362.11
5,871,414 A * 2/1999 Voss et al. ................. 475/175
6,305,748 B1 * 10/2001 Ohba ......................... 297/362

(Continued)

FOREIGN PATENT DOCUMENTS

| CA | 2754055    | 8/2010 |
| EP | 2322378    | 5/2011 |
| WO | 2006011649 | 2/2006 |

*Primary Examiner* — Rodney B White
(74) *Attorney, Agent, or Firm* — Miller Canfield (57) ABSTRACT

A disc recliner for a seat assembly includes a gear plate disposed between fixed and movable plates. The gear and fixed plates are operatively coupled by a pawl that is selectively engaged with the fixed plate. An eccentric element is coupled between bearing surfaces on the gear and movable plates causing a plurality of inwardly-facing teeth on the movable plate to meshingly engage with a plurality of outwardly-facing teeth on the gear plate at an engagement point. When the pawl is disengaged from the fixed plate, the gear and movable plates rotate together relative to the fixed plate to freely pivot a seat back to a folded position. When the pawl is engaged with the fixed plate, rotation of the eccentric element shifts the engagement point and causes wobbling rotational movement of the movable plate relative to the gear plate to pivot the seat back between reclined seating positions.

12 Claims, 8 Drawing Sheets

(51) Int. Cl.
*B60N 2/20* (2006.01)
*B60N 2/225* (2006.01)

(56) References Cited

U.S. PATENT DOCUMENTS

| | | | |
|---|---|---|---|
| 6,619,743 B1 * | 9/2003 | Scholz et al. | 297/362 |
| 6,918,635 B2 * | 7/2005 | Finner et al. | 297/362 |
| 7,086,699 B1 * | 8/2006 | Addison et al. | 297/374 |
| 7,090,298 B2 * | 8/2006 | Lange | 297/362 |
| 7,390,061 B2 * | 6/2008 | Lange | 297/362 |
| 7,513,573 B2 * | 4/2009 | Wahls et al. | 297/362 |
| 7,520,568 B2 * | 4/2009 | Hoshihara et al. | 297/367 R |
| 7,607,737 B2 * | 10/2009 | Liebich et al. | 297/362 |
| 7,766,429 B2 | 8/2010 | Kuroda et al. | |
| 7,802,849 B2 | 9/2010 | Tarusawa et al. | |
| 7,878,593 B2 * | 2/2011 | Nae | 297/362 |
| 7,950,741 B2 | 5/2011 | Mitsuhashi | |
| 7,997,655 B2 * | 8/2011 | Sakai et al. | 297/362 X |
| 8,033,606 B2 * | 10/2011 | Mitsuhashi | 297/362 |
| 8,336,962 B2 * | 12/2012 | Thiel et al. | 297/362 |
| 8,360,525 B2 * | 1/2013 | Cha et al. | 297/362 |
| 8,864,234 B2 * | 10/2014 | McCulloch et al. | 297/367 P |
| 8,931,843 B2 * | 1/2015 | Schuler et al. | 297/367 R |
| 2005/0110322 A1 * | 5/2005 | Cha | 297/362 |
| 2005/0231017 A1 * | 10/2005 | Lange | 297/374 |
| 2006/0170269 A1 * | 8/2006 | Oki | 297/367 |
| 2006/0279121 A1 * | 12/2006 | Matsumoto et al. | 297/362 |
| 2006/0290187 A1 * | 12/2006 | Scholz et al. | 297/362 |
| 2006/0290188 A1 * | 12/2006 | Guillouet | 297/367 |
| 2007/0108824 A1 * | 5/2007 | Lange | 297/367 |
| 2009/0289488 A1 * | 11/2009 | Mitsuhashi | 297/354.12 |
| 2010/0117429 A1 * | 5/2010 | Mitsuhashi | 297/354.12 |
| 2010/0194165 A1 | 8/2010 | Iguchi | |
| 2011/0057494 A1 | 3/2011 | Reubeuze et al. | |
| 2011/0115271 A1 | 5/2011 | Yamada et al. | |

* cited by examiner

QUICK ADJUST CONTINUOUSLY ENGAGED RECLINER

RELATED APPLICATIONS

This application claims priority to and all the benefits of U.S. Provisional Application Nos. 61/532,135, filed Sep. 8, 2011, and entitled "Quick Adjust Continuously Engaged Recliner".

BACKGROUND OF THE INVENTION

1. Field of the Invention

The present invention relates to a disc recliner for a seat assembly of an automotive vehicle that allows pivotal adjustment of a seat back relative to a seat cushion. More particularly, the present invention relates to a continuous disc recliner having a release feature to quickly adjust a seat back to an easy-entry position or a fold flat position.

2. Description of Related Art

Automotive vehicles typically include one or more seat assemblies having a seat cushion and a seat back for supporting a passenger above a vehicle floor. The seat assembly is commonly mounted to the vehicle floor by a seat track assembly for providing fore and aft adjustment of the seat assembly for passenger comfort. The seat back is typically operatively coupled to the seat cushion by a recliner assembly for providing selective pivotal adjustment of the seat back relative to the seat cushion.

One well known type of recliner assembly includes a pair of continuous disc recliners to operatively couple the seat back to the seat cushion. A typical prior art continuous disc recliner as illustrated in U.S. Patent Application Publication No. 2012/0001471 includes a fixed plate secured to the seat cushion and a movable plate secured to the seat back and rotatably coupled to the fixed plate. The fixed plate is formed to include an outer profile having a plurality of outwardly-facing teeth and the movable plate is formed to include an inner profile having a plurality of inwardly-facing teeth. The tooth count of the outwardly-facing teeth is at least one less tooth than the tooth count of the inwardly-facing teeth. A drive mechanism is disposed between the movable plate and the fixed plate and is operable for urging the movable plate to rotate relative to the fixed plate. The drive mechanism includes a cam and a pair of wedges that define an eccentric element, which presses the outwardly-facing teeth on the fixed plate into the inwardly-facing teeth on the movable plate at an engagement point defined by the eccentricity of the eccentric element. When the cam is rotated in a first direction, the wedges are driven in the first direction causing the direction of the eccentricity to shift, thereby shifting the engagement point of the outwardly-facing teeth and the inwardly-facing teeth. The shifting of the engagement point manifests itself as a wobbling rotational movement of the movable plate in the first direction, thereby reclining the seat back. When the cam is rotated in a second direction, the wedges are driven in the second direction causing the direction of the eccentricity to shift, thereby shifting the engagement point of the outwardly-facing teeth and the inwardly-facing teeth. The shifting of the engagement point manifests itself as a wobbling rotational movement of the movable plate in the second direction, thereby raising the seat back. The seat back is maintained in a desired seating position due to friction between the outwardly-facing teeth and the inwardly-facing teeth at the engagement point as well as friction between the wedges and the fixed and movable plates.

One drawback of continuous disc recliners is the inability of providing quick adjustment or "dumping" of the seat back through a large seat back angle to an easy-entry position or a fold flat position overlying the seat cushion. In order to pivot the seat back to the easy-entry position or the fold flat position, continuous disc recliners must be actuated through the entire range of adjustment. While this offers very good fine adjustment of the seat back, the longer actuation time to move the seat back through the large seat back angle is undesirable.

It is desirable therefore to provide a continuous disc recliner having an improved release feature to quickly adjust a seat back to an easy-entry position or a fold flat position.

SUMMARY OF THE INVENTION

According to one aspect of the invention, a disc recliner for an automotive vehicle seat is provided for allowing pivotal movement of a seat back relative to a seat cushion between a plurality of reclined seating positions and a folded position. The disc recliner includes a fixed plate mounted to the seat cushion and a movable plate mounted to the seat back and rotatably coupled to the fixed plate. The fixed plate includes a plurality of first inwardly-facing teeth and the movable plate includes a plurality of second inwardly-facing teeth and a first bearing surface. A gear plate is disposed between the fixed and movable plates. A set of pawls is guided by embossments on the gear plate between an extended position and a retracted position. In the extended position, a plurality of first outwardly-facing teeth on the pawls is meshingly engaged with the first inwardly-facing teeth on the fixed plate, thereby coupling the gear and fixed plates together. In the retracted position, the first outwardly-facing teeth on the pawls is disengaged from the first inwardly-facing teeth on the fixed plate, thereby uncoupling the gear and fixed plates to allow rotational movement of the gear plate relative to the fixed plate. A cam is biased in a first direction to maintain the pawls in the extended position and a release shaft rotates the cam in a second direction. A pawl release plate is coupled to the cam for rotation therewith. The pawl release plate moves the pawls from the extended position to the retracted position in response to rotation of the release shaft to allow quick and easy pivotal movement of the seat back to the folded position. A pair of wedges defines an eccentric element that is operatively coupled between the first bearing surfaces and said gear plate causing a plurality of second outwardly-facing teeth on the gear plate to meshingly engage with the second inwardly-facing teeth on the movable plate at an engagement point. Rotation of a cam-driver rotates the wedges thereby shifting the engagement point between the gear plate and the movable plate and causing wobbling rotational movement of the movable plate relative to the gear plate to pivotally adjust the seat back between the plurality of reclined seating positions.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE EMBODIMENTS

Figure 1:
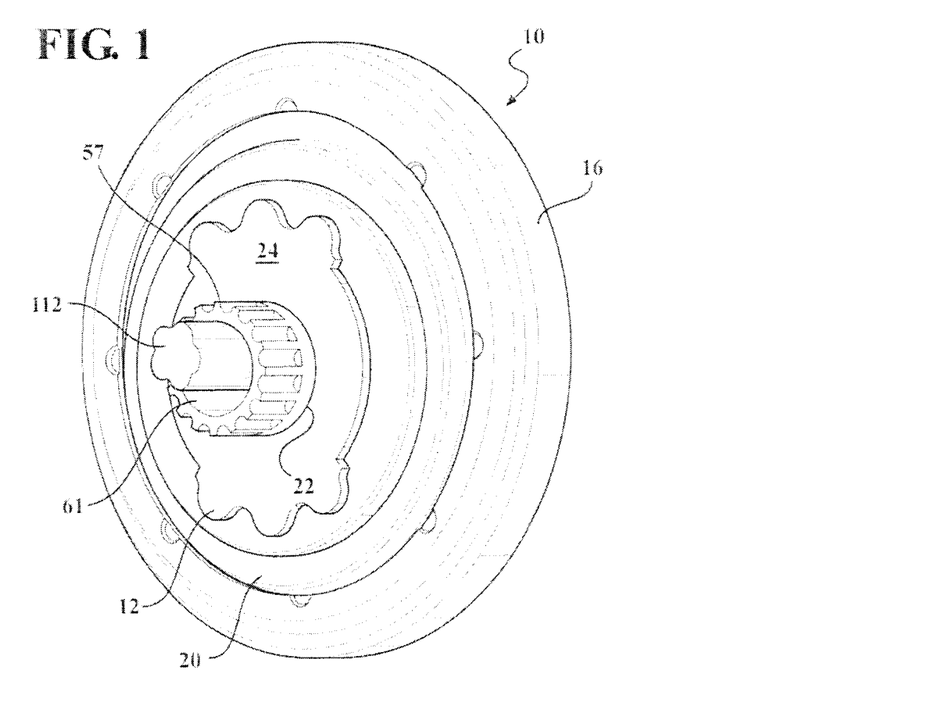
FIG. 1 is an outer perspective view of a continuous disc recliner according to one embodiment of the invention.
Figure 2:
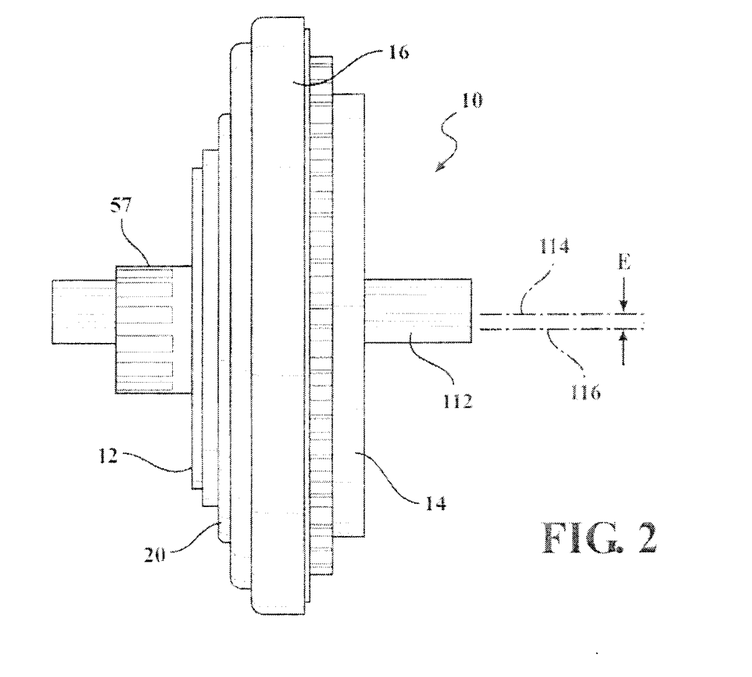
FIG. 2 is a side view of the disc recliner.
Figure 3:
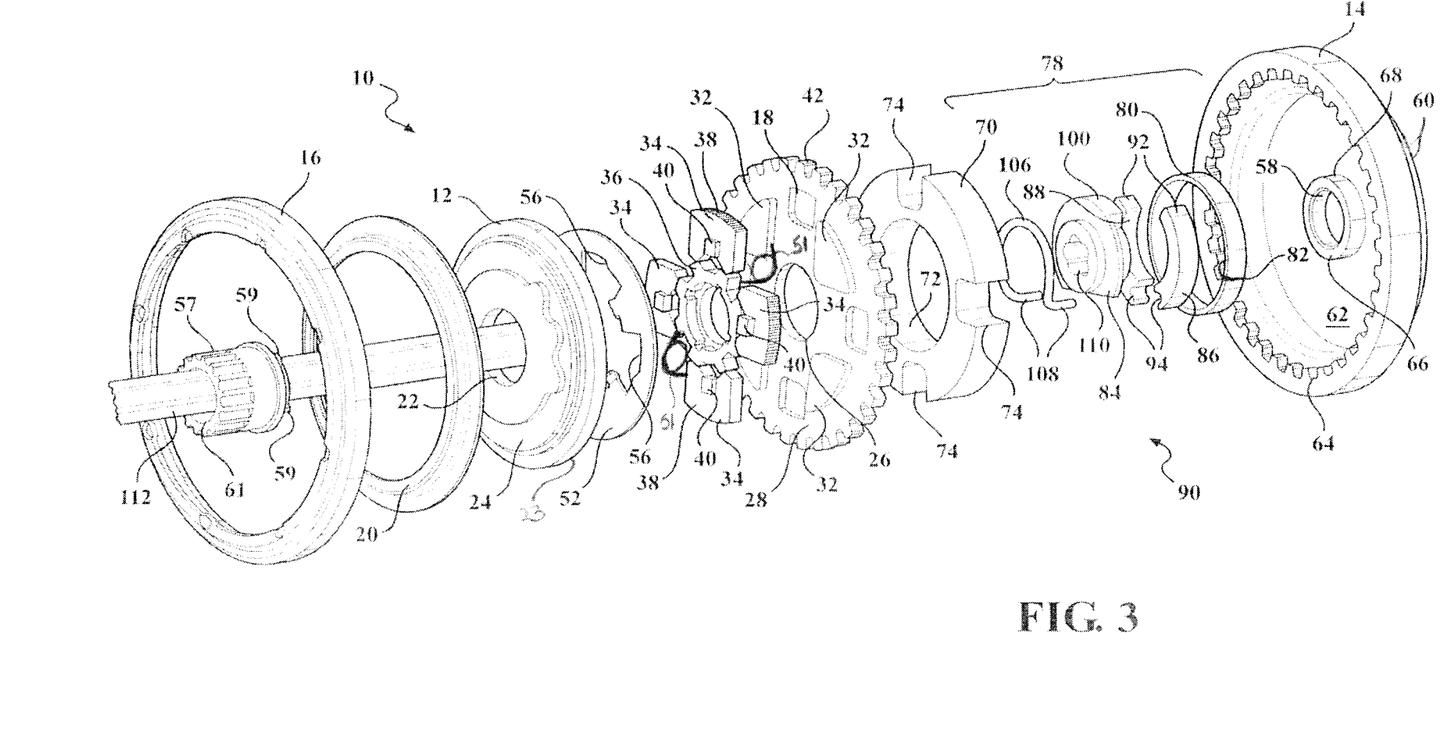
FIG. 3 is an exploded outer perspective view of the disc recliner.
Figure 4:
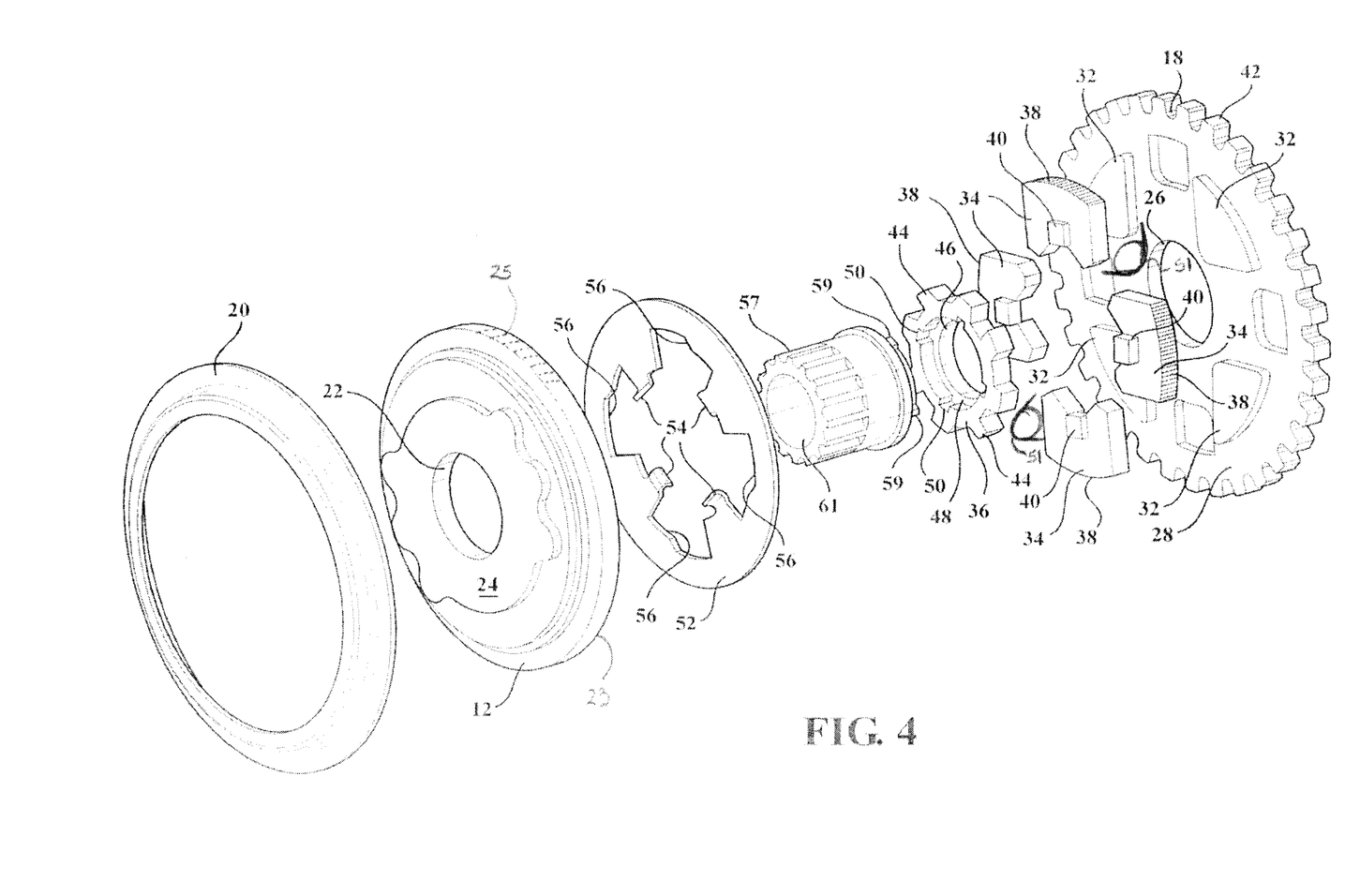
FIG. 4 is a first fragmentary exploded outer perspective view of the disc recliner.
Figure 5:
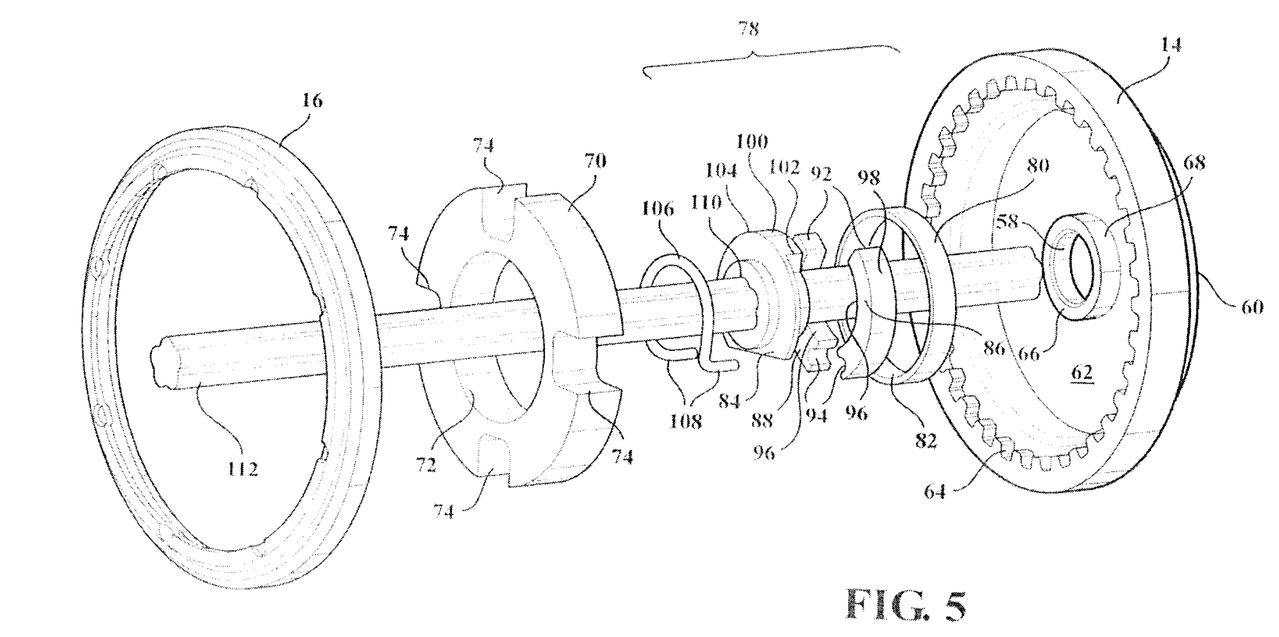
FIG. 5 is a second fragmentary exploded outer perspective view of the disc recliner.
Figure 6:
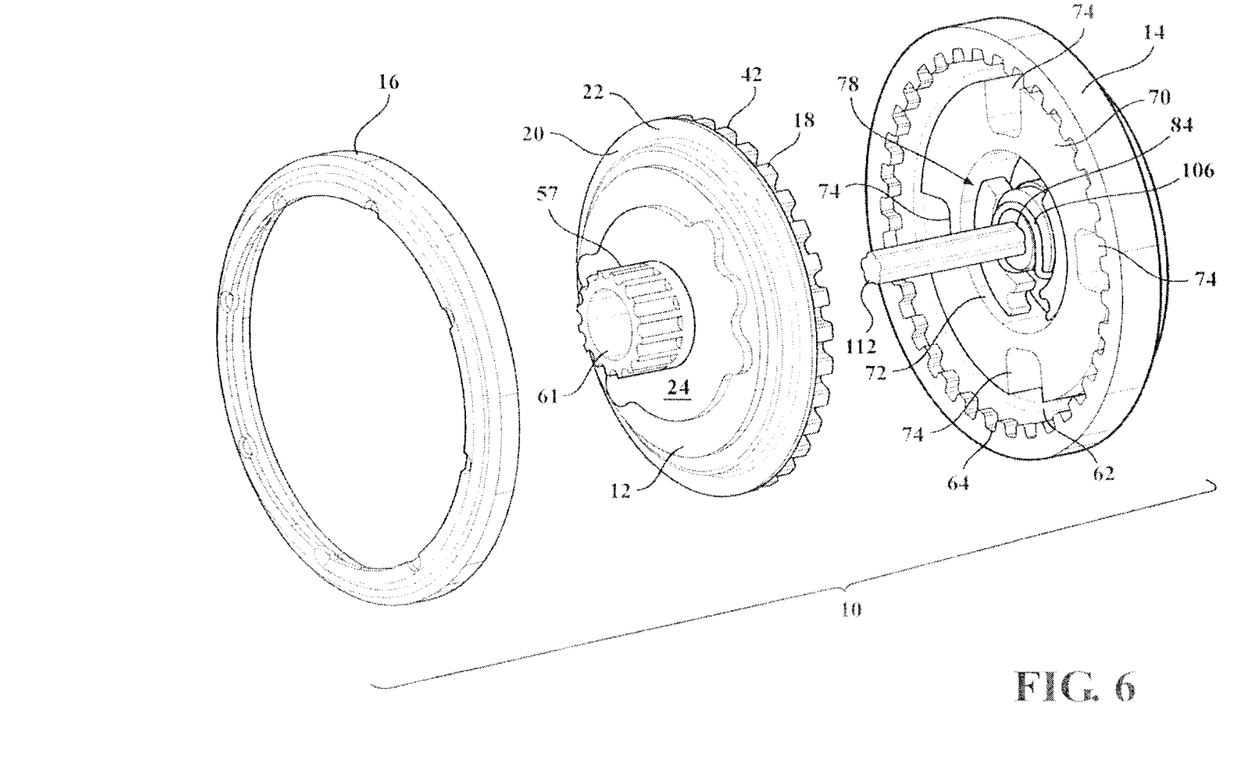
FIG. 6 is a partially exploded outer perspective view of the disc recliner.
Figure 7:
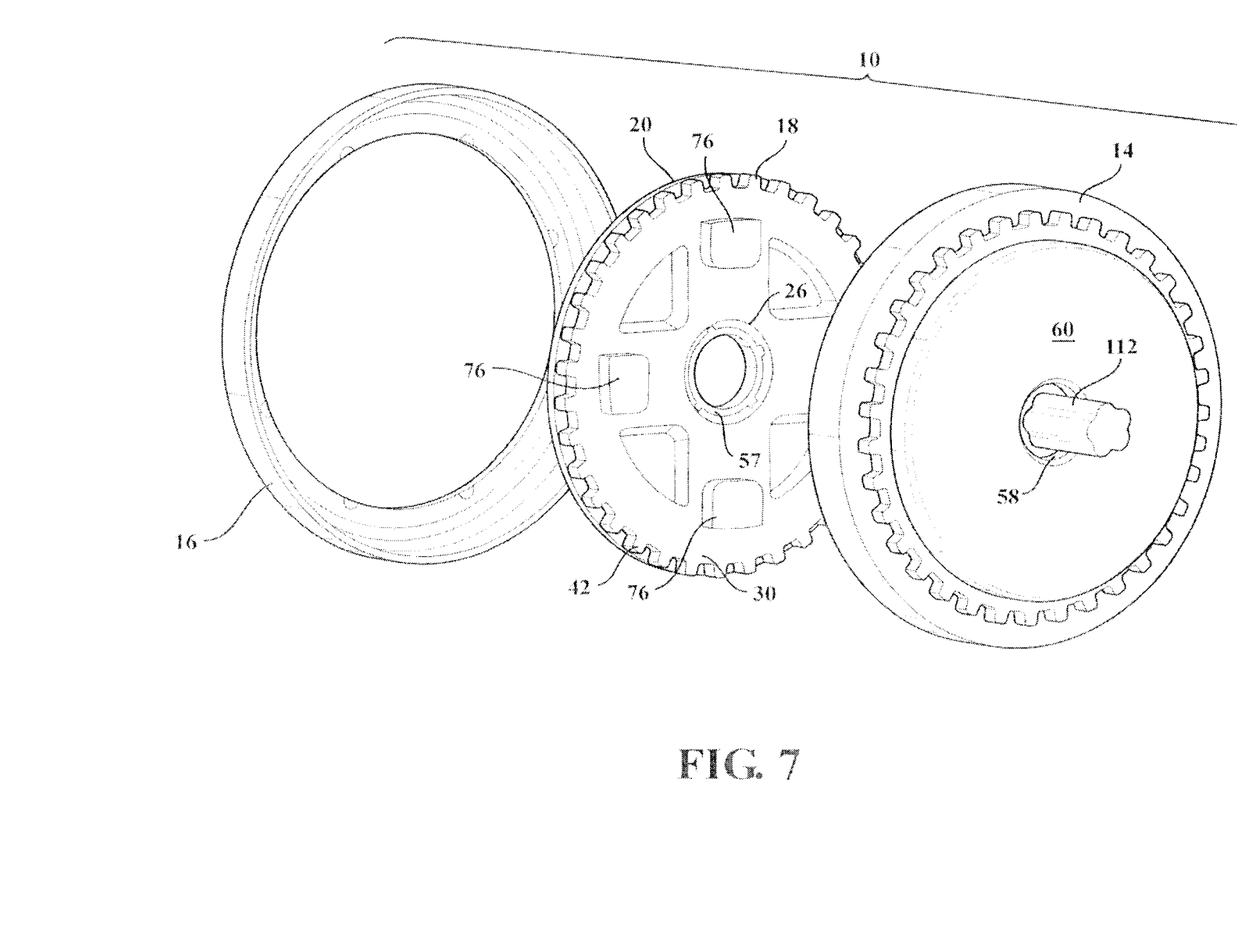
FIG. 7 is a partially exploded inner perspective view of the disc recliner.
Figure 8:
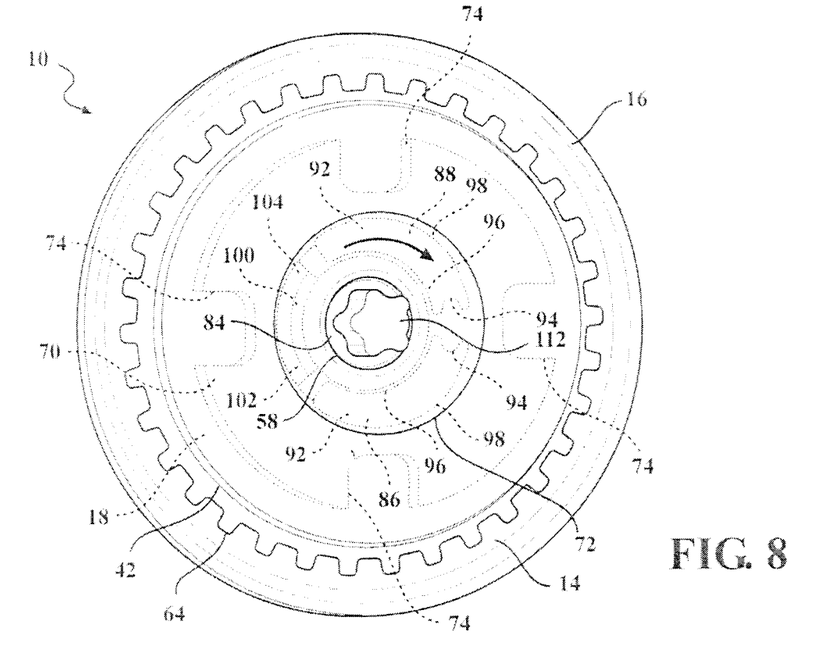
FIG. 8 is an inner perspective view of the disc recliner illustrating operation of the disc recliner in a continuous actuation mode.
Figure 9:
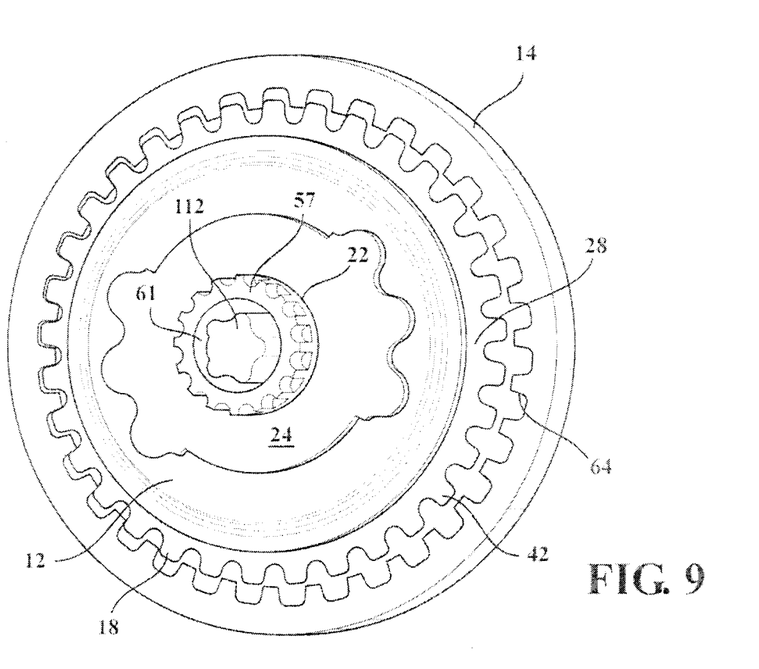
FIG. 9 is a fragmentary outer perspective view of the disc recliner illustrating operation of the disc recliner in the continuous actuation mode.
Figure 10:
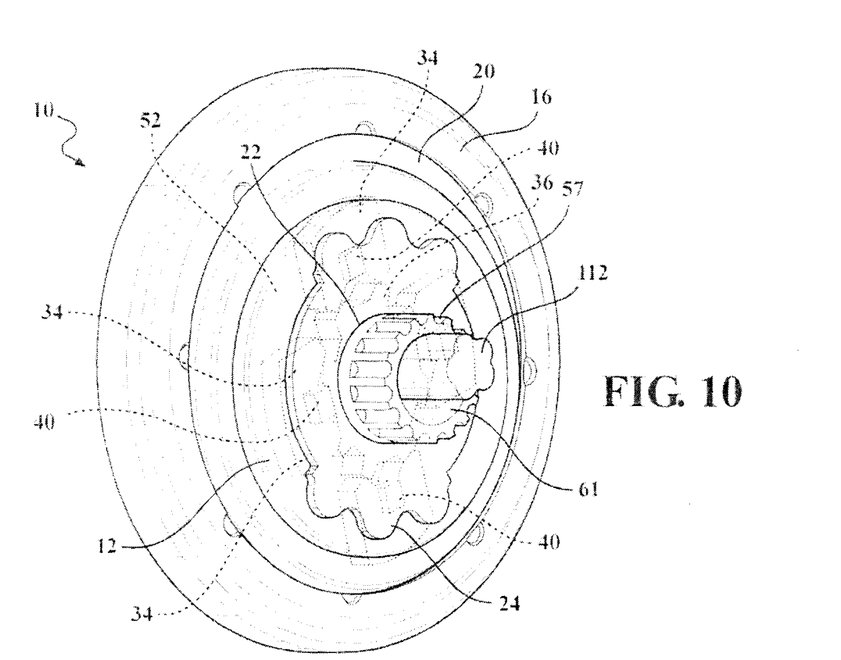
FIG. 10 is an outer perspective view of the disc recliner illustrating operation of the disc recliner in a discontinuous actuation mode.
Figure 11:
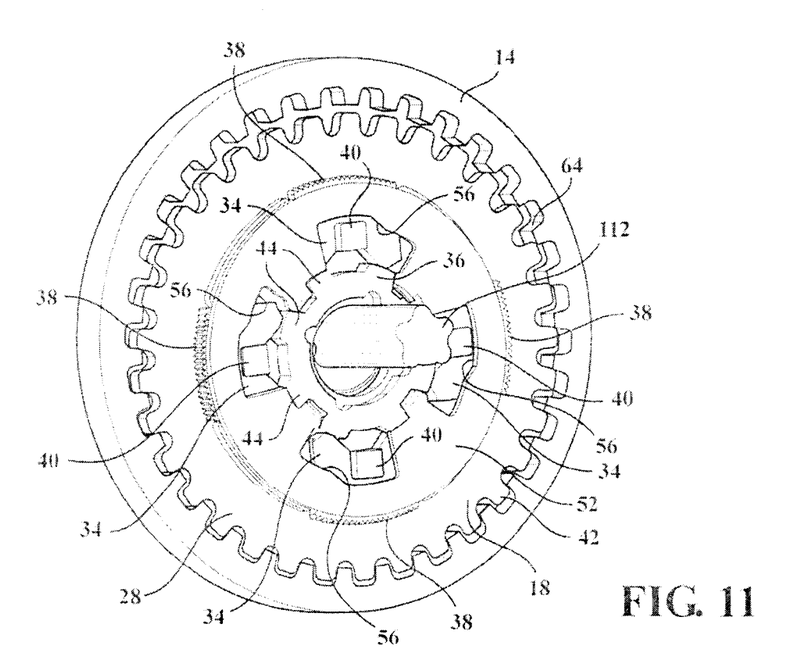
FIG. 11 is a fragmentary outer perspective view of the disc recliner illustrating operation of the disc recliner in the discontinuous actuation mode.

Referring to the Figures, wherein like numerals indicate like or corresponding parts throughout the several views, a seat assembly (not shown) for use in an automotive vehicle includes a generally horizontal seat cushion (not shown) and a generally upright seat back (not shown) for supporting a seat occupant as is commonly known in the art. The seat back is operatively coupled to the seat cushion by a recliner assembly for providing pivotal movement between an upright seating position, a plurality of reclined seating positions, and an easy-entry position or fold flat position overlying the seat cushion. The recliner assembly generally includes a pair of spaced apart and synchronized continuous disc recliners, one of which is shown at 10 and is described below in detail.

The disc recliner 10 includes a fixed plate 12 adapted to be secured to the seat cushion and a movable plate 14 adapted to be secured to the seat back and rotatably coupled to the fixed plate 12. The fixed plate 12 and the movable plate 14 are held together by a retaining ring 16 that is fixedly secured to the movable plate 14 and allows a wobbling rotational movement of the movable plate 14 relative to the fixed plate 12, as is described below in more detail. A gear plate 18 is sandwiched between the fixed 12 and movable 14 plates. The gear plate 18 is adapted to be selectively coupled and secured to the fixed plate 12 and meshingly engaged with the movable plate 14 to provide fine adjustment of the seat back relative to the seat cushion. The gear plate 18 is also adapted to be selectively decoupled and released from the fixed plate 12 to provide quick and easy adjustment of the seat back relative to the seat cushion. The disc recliner 10 also includes a retaining cover 20 disposed between the retaining ring 16 and the fixed plate 12. Since the retaining ring 16 is fixed to the movable plate 14, the retaining cover 20 is sized to allow for the wobbling rotational movement of the retaining ring 16 with the movable plate 14. It is understood that rotation of the movable plate 14 relative to the fixed plate 12 causes pivotal movement of the seat back relative to the seat cushion.

The fixed plate 12 is circular, generally cup-shaped, and includes a first central bore 22 extending axially therethrough. The fixed plate 12 also includes an inner side 23 and an opposite outer side 24 that is adapted to be secured to the seat cushion. The inner side 23 defines an inner axial edge extending circumferentially around the fixed plate 12 having a plurality of first radially inwardly-facing teeth 25 disposed therearound.

The gear plate 18 is circular and includes a second central bore 26 extending axially therethrough. The gear plate 18 also includes a first side 28 facing the inner side 23 of the fixed plate 12 and an opposite second side 30. The first side 28 includes four axially raised embossments 32 that guide a set of pawls 34 radially inward and outward to actuate the disc recliner 10 between a continuous actuation mode and a discontinuous actuation mode in response to rotation of a cam 36. In the embodiment shown, there are four pawls 34 and each pawl 34 includes an outer edge having a plurality of first outwardly-facing teeth 38 that is adapted for meshing engagement with the first inwardly-facing teeth 25 on the fixed plate 12. Each pawl 34 also includes a pip 40 extending in an axial direction. An outer edge extending circumferentially around the gear plate 18 includes a plurality of second radially outwardly-facing teeth 42 disposed therearound.

The cam 36 includes an outer profile having lobes 44 corresponding to an inner profile of each one of the pawls 34. The cam 36 also includes a third central bore 46 extending axially therethrough and a depressed region 48 encircling the third central bore 46. The depressed region 48 includes at least one recess 50 extending in a radial direction. In the current embodiment, the depressed region 48 has four recesses 50 spaced circumferentially around the depressed region 48. One or more springs 51, such as a clock spring coupled between the cam 36 and the gear plate 18, bias the cam 36 in a first direction (clockwise when viewed from the Figures) toward a position wherein the pawls 34 are in an extended position. In the extended position, the first outwardly-facing teeth 38 on the pawls 34 are in meshing engagement with the first inwardly-facing teeth 25 on the fixed plate 12. Thus, when the pawls 34 are in the extended position, the gear plate 18 is coupled to the fixed plate 12 and the disc recliner 10 is in the continuous actuation mode to prevent rotational movement of the gear plate 18 relative to the fixed plate 12.

A pawl release plate 52 is coupled to the cam 36 for rotation therewith. More specifically, the pawl release plate 52 includes tabs 54 that extend in the axial direction and engage between lobes 44 on the cam 36 such that the pawl release plate 52 and the cam 36 rotate together. The pawl release plate 52 includes an inner profile 56 for receiving the pip 40 on each of the pawls 34 therein. When the cam 36 is rotated in a second direction against the biasing force of the springs 51, the pawl release plate 52 rotates in the second direction with the cam 36 and the inner profile 56 urges the pips 40 radially inward, thereby moving the pawls 34 from the extended position to a retracted position. In the retracted position, the first outwardly-facing teeth 38 on the pawls 34 are disengaged from the first inwardly-facing teeth 25 on the fixed plate 12. Thus, when the pawls 34 are in the retracted position, the gear plate 18 is uncoupled from the fixed plate 12 and the disc recliner 10 is in the discontinuous actuation mode to allow rotational movement of the gear plate 18 relative to the fixed plate 12, thereby pivoting the seat back.

A release shaft 57 is provided for rotating the cam 36 in the second direction to actuate the disc recliner 10 from the continuous actuation mode to the discontinuous actuation mode. The release shaft 57 extends in the axial direction through the first central bore 22 of the fixed plate 12 and is adapted to engage with the depressed region 48 of the cam 36. More specifically, an inner end of the release shaft 57 includes four protrusions 59 extending in the radial direction that correspond with and are received in the recesses 50 in the depressed region 48 of the cam 36 such that rotation of the release shaft 57 in the second direction will rotate the cam 36 in the second direction. A lever or handle mechanism may be attached to an outer end of the release shaft 57 to rotate the release shaft 57 in the second direction. The release shaft 57 also includes a fourth central bore 61 extending axially therethrough.

The movable plate 14 is circular, generally cup-shaped, and includes a fifth central bore 58 extending axially therethrough. The movable plate 14 also includes an outer side 60 that is adapted to be secured to the seat back and an opposite inner side 62 facing the second side 30 of the gear plate 18. The inner side 62 defines an inner edge extending circumferentially around the movable plate 14 having a plurality of second inwardly-facing teeth 64 disposed therearound. The second outwardly-facing teeth 42 on the gear plate 18 is adapted for meshing engagement with the second inwardly-facing teeth 64 on the movable plate 14. The tooth count of the second outwardly-facing teeth 42 is at least one less tooth than the tooth count of the second inwardly-facing teeth 64. The corresponding difference in the number of second outwardly-facing teeth 42 and second inwardly-facing teeth 64 permits a wobbling rotational movement of the movable plate 14 about the gear plate 18. The inner side 62 of the movable plate 14 also includes a collar 66 encircling the fifth central bore 58 and protruding in the axial direction toward the gear plate 18. An outer surface of the collar 66 defines a first bearing surface 68.

A drive ring 70 is disposed between the second side 30 of the gear plate 18 and the inner side 62 of the movable plate 14. The drive ring 70 includes a sixth central bore 72 extending axially therethrough and an outer profile having four reliefs 74 that engage four corresponding bosses 76 protruding in the axial direction from the second side 30 of the gear plate 18. The sixth central bore 72 is adapted for receiving a drive mechanism, generally shown at 78. The drive mechanism 78 is operable for urging the movable plate 14 to rotate relative to the gear plate 18.

The drive mechanism 78 includes a friction ring 80 that is pressed into the sixth central bore 72 of the drive ring 70. An inner surface of the friction ring 80 defines a second bearing surface 82. The drive mechanism 78 also includes a cam-driver 84 and a pair of wedges 86, 88 that are arranged in a mirror-image fashion. The wedges 86, 88 define an eccentric element 90. Each one of the wedges 86, 88 extends between a narrow end 92 and a wide end 94 and includes an inner side 96 and an outer side 98. The inner side 96 of each wedge 86, 88 rests against the first bearing surface 68 of the movable plate 14 and the outer side 98 of each wedge 86, 88 rests against the second bearing surface 82 of the friction ring 80. The cam-driver 84 includes a drive segment 100 that extends in a circumferential direction between a first end 102 and a second end 104. The driver segment 100 is disposed radially between the first bearing surface 68 and the second bearing surface 82 and circumferentially between the narrow ends 92 of the respective wedges 86, 88. The wedges 86, 88 are acted upon by a wedge spring 106 to prevent play in the drive mechanism 78. The wedge spring 106 includes two legs 108 bent at right angles that bear against the wide ends 94 of the wedges 86, 88, thereby forcing the wedges 86, 88 apart in the circumferential direction.

The cam-driver 84 also includes a central aperture 110 for receiving a drive shaft 112 to rotate the cam-driver 84 in the first and second directions. The drive shaft 112 extends in the axial direction through the disc recliner 10. More specifically, the drive shaft 112 passes through the fourth central bore 61 of the release shaft 57, the first central bore 22 of the fixed plate 12, the third central bore 46 of the cam 36, the second central bore 26 of the gear plate 18, the central aperture 110 of the cam-driver 84, and the fifth central bore 58 of the movable plate 14. An outer profile of the drive shaft 112 is adapted to engage with the central aperture 110 of the cam-driver 84. The drive shaft 112 may be rotated manually or by a power motor, as is well known in the art.

Due to the insertion of the eccentric element 90 between the movable plate 14 and the gear plate 18, an eccentricity E is created between a central axis 114 of the drive shaft 112 and a central axis 116 of the release shaft 57. This eccentricity E urges the second inwardly-facing teeth 64 on the movable plate 14 into engagement with the second outwardly-facing teeth 42 on the gear plate 18 at an engagement point in a direction defined by the eccentricity E.

In operation, beginning with the seat back in one of the plurality of reclined seating positions and the disc recliner 10 in the continuous actuation mode, the seat occupant can actuate the drive shaft 112 in the first direction to recline the seat back. Actuating the drive shaft 112 in the first direction causes the cam-driver 84 to rotate in the first direction. Rotating the cam-driver 84 in the first direction causes the first end 102 of the drive segment 100 to engage the narrow end 92 of the wedge 86, which drives the wedge 86 in the first direction. Driving the wedge 86 in the first direction causes the other wedge 88 to also drive in the first direction because the wedge spring 106 transfers movement from one wedge 86 to the other wedge 88. As the wedges 86, 88 are driven in the first direction they slide along the second bearing surface 82, shifting the direction of the eccentricity E and therefore shifting the engagement point of the second inwardly-facing teeth 64 on the movable plate 14 and the second outwardly-facing teeth 42 on the gear plate 18. The shifting of the engagement point manifests itself as a wobbling rotational movement of the movable plate 14 in the first direction, thereby reclining the seat back.

Similarly, actuating the drive shaft 112 in the second direction causes the cam-driver 84 to rotate in the second direction. Rotating the cam-driver 84 in the second direction causes the second end 104 of the drive segment 100 to engage the narrow end 92 of the wedge 88, which drives the wedge 88 in the second direction. Driving the wedge 88 in the second direction causes the other wedge 86 to also drive in the second direction because the wedge spring 106 transfers movement from one wedge 88 to the other wedge 86. As the wedges 86, 88 are driven in the second direction they slide along the second bearing surface 82, shifting the direction of the eccentricity E and therefore shifting the engagement point of the second inwardly-facing teeth 64 on the movable plate 14 and the second outwardly-facing teeth 42 on the gear plate 18. The shifting of the engagement point manifests itself as a wobbling rotational movement of the movable plate 14 in the second direction, thereby raising the seat back.

Alternatively, beginning with the seat back in one of the plurality of reclined seating positions and the disc recliner 10 in the continuous actuation mode, a user standing next to the seat assembly can actuate the release shaft 57 in the second direction to actuate the disc recliner 10 to the discontinuous actuation mode to quickly adjust the seat back to the easy-entry of fold flat position. Rotating the release shaft 57 in the second direction causes the cam 36 and simultaneously the pawl release plate 52 to rotate in the second direction. As the cam 36 and pawl release plate 52 rotate in the second direction, the inner profile 56 of the pawl release plate 52 engages the pip 40 on each pawl 34 and moves the pawls 34 radially inward from the extended position to the retracted position. In the retracted position, the first outwardly-facing teeth 38 on the pawls 34 are disengaged from the first inwardly-facing teeth 25 on the fixed plate 12, allowing rotational movement of the gear plate 18 in the second direction about the center of the release shaft 57, thereby allowing the seat back to pivot forwardly. A stop (not shown) may be provided to block the seat back in the easy-entry position. Alternatively, the seat back may pivot forwardly to the fold flat position.

The invention has been described in an illustrative manner, and it is to be understood that the terminology, which has been used, is intended to be in the nature of words of description rather than of limitation. Many modifications and variations of the present invention are possible in light of the above teachings. It is, therefore, to be understood that within the scope of the appended claims, the invention may be practiced other than as specifically described.

What is claimed:

1. A disc recliner operatively coupling a seat back to a seat cushion to allow pivotal movement of the seat back between a plurality of reclined seating positions and a folded position, said disc recliner comprising:
   a fixed plate adapted to be mounted to the seat cushion;
   a movable plate adapted to be mounted to the seat back and rotatably coupled to said fixed plate, said movable plate including a plurality of inwardly-facing teeth and a first bearing surface;
   a gear plate disposed between said fixed and movable plates, said gear plate including a plurality of outwardly-facing teeth;
   at least one pawl operatively coupled to said gear plate, wherein said pawl is movable between a first position engaged with said fixed plate, thereby coupling said gear plate and said fixed plate together, and a second position wherein said pawl is disengaged from said fixed plate, thereby uncoupling said gear plate and said fixed plate to allow rotational movement of said gear plate relative to said fixed plate;
   a cam biased in a first direction for maintaining said pawl in said first position;
   a release shaft for rotating said cam in a second direction;
   a pawl release plate coupled to said cam for rotation therewith, wherein said pawl release plate moves said pawl from said first position to said second position in response to rotation of said release shaft to allow pivotal movement of the seat back to the folded position;
   a pair of wedges defining an eccentric element is operatively coupled between said first bearing surface of said movable plate and said gear plate, thereby causing said outwardly-facing teeth on said gear plate to meshingly engage with said inwardly-facing teeth on said movable plate at an engagement point; and
   a cam-driver, wherein rotation of said cam-driver rotates said wedges thereby shifting said engagement point between said gear and movable plates and causing wobbling rotational movement of said movable plate relative to said gear plate to pivotally adjust the seat back between the plurality of reclined seating positions.

2. A disc recliner as set forth in claim 1 including a drive ring lockingly coupled to said movable plate and operatively coupled to said cam driver for transfer rotation of said cam driver to said rotational movement of said movable plate.

3. A disc recliner as set forth in claim 2 including a friction ring defining a second bearing surface and said drive ring including a central bore for receiving said friction ring therein, said pair of wedges operatively coupled between said first bearing surface of said moveable plate and said second bearing surface of said friction ring.

4. A disc recliner as set forth in claim 3 wherein said cam driver includes a central bore and said disc recliner includes a drive shaft extending axially through said central bore for actuating rotation of said cam driver in first and second directions causing said wobbling rotational movement of said movable plate relative to said gear plate.

5. A disc recliner as set forth in claim 4 wherein said pair of wedges includes spaced apart facing narrow ends and opposite spaced apart facing wider ends, said cam driver including a drive segment seated between said spaced apart narrow ends for rotating said wedges in said first and second direction upon rotation of said cam driver.

6. A disc recliner as set forth in claim 5 further including a wedge spring seated between said spaced apart wide ends of said wedges for resisting rotation of said cam driver in said first and second directions.

7. A disc recliner as set forth in claim 6 wherein said fixed plate includes a central bore, an outer side, an inner side facing said gear plate, and a plurality of circumferential peripheral teeth surrounding said central bore.

8. A disc recliner as set forth in claim 7 wherein said gear plate includes a central bore aligned coaxially with said central bore of said fixed plate, a first side facing said fixed plate, an opposite second side, and a plurality of spaced apart raised embossments for slidably guiding radial movement of said pawls between said first and second positions.

9. A disc recliner as set forth in claim 8 wherein each of said pawls include a plurality of teeth for engagement with said teeth on said fixed plate in said first position to coupled said gear plate and fixed plate together for rotation relative to said movable plate.

10. A disc recliner as set forth in claim 9 wherein said cam includes a plurality of radially projecting lobes for engaging said pawls and actuating said pawl from said second position to said first position engaged with said fixed plate in response to rotation of said cam in a first direction.

11. A disc recliner as set forth in claim 10 wherein said pawls include an axially raised pip and said pawl release plate includes an inner profile shaped to engage said pips and actuate said pawls from said first position to said second position release from said fixed plate in response to rotation of said cam in a second direction opposite said first direction.

12. A disc recliner as set forth in claim 11 wherein said release shaft includes a central bore and wherein said drive shaft extends through said central bore of said release shaft defining an eccentric therebetween to facilitate said wobbling rotation of said gear plate relative to said movable plate.

* * * * *